United States Patent Office 2,764,614
Patented Sept. 25, 1956

2,764,614

CHLOROHYDROXYSALICYLANILIDES

Jules Meyer, Basel, Switzerland, assignor to Ciba Pharmaceutical Products, Inc., Summit, N. J.

No Drawing. Application April 8, 1954,
Serial No. 421,947

Claims priority, application Switzerland April 14, 1953

8 Claims. (Cl. 260—559)

This invention relates to new salicyclic acid amides of the formula

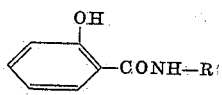

and their manufacture, in which R represents a phenyl radical containing as a substituent at least one halogen atom, advantageously a chlorine atom, and in 2-position a free hydroxyl group, and also metal salts of these compounds, such as their alkali or alkaline earth metal salts or salts with metals capable of forming complexes, such as copper.

The invention relates more especially to N-(2-hydroxy-3,5-dichlorophenyl)-salicylamide, N-(2-hydroxy-4-chlorophenyl)-salicylamide and N-(2-hydroxy-5-chlorophenyl)-salicylamide and also metal salts thereof, for example, their sodium salts.

The new N-(2-hydroxy-halophenyl)-salicylamides have strong antibacterial and fungicidal properties. They have a strong disinfecting and preserving action and can be used in a very wide variety of fields as disinfecting and preserving agents. They are suitable, for example, in the textile industry for preserving goods, or for disinfecting the skin, instruments, bandage materials, washable goods and the like, and also for disinfecting or preserving nutrient substances and food. They may be used alone or mixed, if desired, together with other active or inert substances, in solution or in the form of an emulsion, such as salve, or in the form of dry powders.

As compared with the corresponding compounds in which the hydroxyl group in the radical R is absent or is present in the 4-position instead of the 2-position, or is substituted, the compounds of the present invention exhibit under the same conditions higher activity, against Staph. aureus or Escherichia coli, as will be seen from the following table:

| Compound of the general formula ONa —CO—NH—R | Limiting dilution of bacteriostatic activity (grams per liter) | | Limiting dilution of bactericidal activity (grams per liter) | |
|---|---|---|---|---|
| | Staph. aureus | E. coli | Staph. aureus | E. coli |
| R—⟨⟩—Cl | 0.01–0.005 | >1 | ≥1 | >1 |
| R—⟨OCH₃⟩—Cl | 0.5 | 0.5 | >1 | >1 |
| R—⟨Cl⟩—ONa (Cl) | ≥0.1 | >1 | >1 | >1 |
| R—⟨ONa⟩—Cl | 0.005 | 0.05 | 0.05 | 0.1 |
| R—⟨ONa Cl⟩—Cl | 0.001 | 0.05 | 0.05 | >1 |

The new N-(2-hydroxy-halophenyl)-salicylamides can be prepared by various methods.

Thus, for example, a benzoic acid or a reactive derivative thereof, such as a halide, which contains in the 2-position a free hydroxyl group or a substituent convertible into a free hydroxyl group, e. g., an acyloxy group, and is otherwise unsubstituted, is reacted with a haloaniline which possesses in 2-position a free hydroxyl group or a substituent convertible into a free hydroxyl group. In salicylamides so obtained which contain substituents convertible into free hydroxyl groups, these substituents are then converted into hydroxyl groups.

The aforesaid reactions are carried out in known manner in the absence or presence of a diluent and/or a condensing agent and/or a catalyst, if desired, while cooling or at a raised temperature under atmospheric or superatmospheric pressure. Thus, for example, in reacting salicylic acid with a 2-hydroxy-haloaniline, the reaction is advantageously carried out in the presence of a dehydrating agent, especially phosphorus trichloride or thionyl chloride in an anhydrous solvent.

Depending on the method used the processes described above lead to the new compounds in the form of free phenols or salts thereof. The latter may be converted into the phenols in the usual manner. From the latter there may be prepared, for example, by reaction with metal hydroxides or by double decomposition of suitable salts, metal salts, such as alkali metal salts or salts with metals capable of forming complexes, such as copper.

The following examples illustrate the invention; the parts being by weight unless otherwise stated and the relationship of parts by weight to parts by volume being the same as that of the gram to the cubic centimeter:

Example 1

14 parts of phosphorus trichloride are introduced, while stirring well, at 50° C. into a mixture of 34.5 parts of salicylic acid and 36 parts of 2-hydroxy-4-chloraniline in 600 parts by volume of toluene which has been dried over sodium. The reaction mixture is then heated at the boil under reflux for a few hours, while stirring continuously. The mixture is then cooled, mixed with 300 parts by volume of water, and neutralized with a 2N-solution of sodium carbonate. The reaction mixture is then subjected to distillation with steam. The residue is allowed to cool, the crystalline reaction product is filtered off, washed with water and dried. The crude slightly pale brown reaction product (melting at 161–167° C.) is recrystallized several times from methanol with the use of Norit (animal charcoal), and two different products are obtained. The main product, constituting about 70 per cent of the yield, melts at 180–181° C. and the other product, which precipitates first during recrystallization, melts at 153° C., The higher melting product is N-(2-hydroxy-4-chlorophenyl)-salicylamide. It is again recrystallized twice from glacial acetic acid and then melts at 181.5–182° C.

In order to prepare the sodium salt, 10 parts of the above salicylamide are dissolved to give a clear solution with slight heating in 130 parts by volume of distilled water and 6.8 parts by volume of a concentrated solution of caustic soda. The solution is then evaporated to dryness in vacuo. The sodium salt so obtained dissolves in water to give a clear solution.

Example 2

A mixture of 300 parts by volume of toluene dried over sodium, 28 parts of salicyclic acid and 36.1 parts of 2-hydroxy-3,5-dichloraniline is heated at 60° C., while stirring. There are then added at that temperature, while stirring continuously 11.3 parts of phosphorus trichloride, and then the mixture is heated for a few hours at the boil under reflux. The reaction mixture is then cooled and neutralized with a 2N-solution of sodium carbonate after the addition of 300 parts by volume of water. The reaction mixture is then subjected to steam distillation. The residue is cooled, filtered and the filter residue is washed with water and dried. The crude product so obtained is almost colorless and melts at 188–195° C. It is first recrystallized from absolute methanol with the use of Norit, whereby there is first obtained a small amount of a low melting product melting at 142° C. From the concentrated mother liquor there is then precipitated as the main portion a product melting at 213–214° C. The latter product is recrystallized a few times from aqueous methanol of 85 per cent strength. The resulting N-(2-hydroxy-3,5-dichlorophenyl)-salicylamide melts at 218.5–219° C.

In order to prepare the sodium salt 2 parts of the aforesaid salicyclic acid amide are dissolved hot in 100 parts by volume of distilled water to which 1.35 parts by volume of a concentrated solution of caustic soda have previously been added. The solution is evaporated to dryness in vacuo. The sodium salt remaining behind dissolves clearly in water.

Example 3

A suspension of 345 parts of salicyclic acid and 370 parts of commercial 2-hydroxy-5-chloraniline (97 per cent strength) in 5000 parts by volume of dry toluene is gradually mixed at 50° C., while stirring with 140 parts of phosphorus trichloride. The mixture is then heated for 4 hours at the boil. The mixture is then mixed with 3000 parts by volume of water and 1000 parts by volume of a 2N-solution of sodium carbonate, and the whole is stirred for a further hour and subjected to distillation with steam. The distillation residue is isolated on a suction filter and purified by treatment with methanol and filtration, whereby an insoluble accompanying fraction can be separated. The filtrate is evaporated to dryness, the residue is taken up in a 0.5N-solution of caustic soda, the solution is clarified by filtration, the product is precipitated with hydrochloric acid and the precipitate is separated by filtering with suction. The compound is finally dissolved in ethanol, and the solution is boiled with animal charcoal and mixed with its own volume of boiling water. The crystals which separate in the cold are filtered off with suction and dried. The resulting N-(2-hydroxy-5-chlorophenyl)-salicylamide melts at 194–194.5° C. It can be converted in its sodium salt in the manner indicated in Example 2.

From the N-(2-hydroxy-5-chlorophenyl)-salicylamide there can be made in the usual manner a therapeutically useful salve of the following composition: 2.5% N-(2-oxy-5-chlorophenyl)-salicyclic acid amide, 31.5% Carbowax 1540, 30% Carbowax 4000, 30% propylene glycol, 6% water.

Furthermore, N-(2-hydroxy-5-chlorophenyl)-salicylamide can be used for industrial purposes, for example, in the form of its sodium salt. Thus, cellulosic material, such as cotton fabrics, can be impregnated with a 0.05 per cent. aqueous solution of the sodium salt to obtain a good protection against mildew.

Furthermore, the sodium salt can be tabletted with starch, if desired with the addition of agents accelerating dissolution in water, for use as disinfecting and preserving agents. By mixing the salt with finely powdered diluents, e. g. urea, cork meal or similar substances, a useful dusting powder is obtained.

Example 4

700 parts of acetylsalicyclic acid chloride, dissolved in 1200 parts by volume of absolute ether, are gradually added while stirring at 0° C. to a solution of 1820 parts of commercial 2-hydroxy-3:5:6-trichloraniline (of 83.3 per cent strength) in 550 parts by volume of absolute ether. The mixture is stirred for 2 hours at room temperature and 3 hours at 40° C. The reaction product is then suction-filtered and washed by slurring in turn in water, 0.1N-hydrochloric acid, and water. It is then dissolved cold in very dilute caustic soda solution, and after the removal of insoluble constituents, precipitated with dilute hydrochloric acid, and suction-filtered. For purification, the filter cake is dissolved in alcohol, the solution boiled with active charcoal, filtered, and mixed while boiling with the same quantity of boiling water. Crystallization sets in soon. The product is not pure and must be recrystallized a second time in the same manner. There are thus obtained 340 parts of N-(2-hydroxy-3:5:6-trichlorophenyl)-acetylsalicyclic acid amide of melting point 216.5–217.5° C. After another recrystallization the melting point is at 217–218° C.

In order to hydrolyze the acetyl group, 1 part of the acetyl compound is heated to 80° C. for 30 minutes in 20 parts by volume of 0.5N-caustic soda solution, precipitated while hot with hot dilute hydrochloric acid, filtered, and the filter residue thoroughly washed with water. It is then recrystallized by dissolving it in 20 parts by volume of alcohol and adding 10 parts by volume of boiling water to the boiling solution. There is obtained a quantitative yield of N-(2-hydroxy-3:5:6-trichlorophenyl)-salicylic acid amide in the form of matted needles of melting point 219.5–220° C. After another recrystallization the melting point is at 221° C.

What is claimed is:
1. N-(2-hydroxy-3,5-dichlorophenyl)-salicylamide.
2. The sodium salt of N-(2-hydroxy-3,5-dichlorophenyl)-salicylamide.
3. N-(2-hydroxy-4-chlorophenyl)-salicylamide.
4. N-(2-hydroxy-5-chlorophenyl)-salicylamide.
5. N-(2-hydroxy-3:5:6-trichlorophenyl)-salicylamide.

6. A member of the group consisting of salicyclic acid amides of the formula:

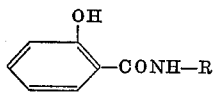

in which R represents a phenyl radical containing in 2-position a free hydroxyl group and as sole, further substituents at least one halogen atom, the halogen atom having an atomic weight of less than 80; and the alkali metal salts, the alkaline earth metal salts and the salts thereof with complex forming metals of the first group of the periodical system.

7. Salicyclic acid amides of the formula:

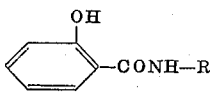

in which R represents a phenyl radical containing in 2-position a free hydroxyl group and as sole, further substituents at least one chlorine atom.

8. The sodium salts of the compounds claimed in claim 7.

References Cited in the file of this patent
UNITED STATES PATENTS
2,047,513  Laska et al. _____ July 14, 1936

OTHER REFERENCES

Van Allan: "J. Am. Chem. Soc.," vol. 69 (1947), pp. 2913–14.

Hirwe et al.: "J. Ind. Chem. Soc.," vol. 16 (1939), pp. 281–4.